United States Patent
Yanagibayashi et al.

(10) Patent No.: US 12,146,868 B2
(45) Date of Patent: Nov. 19, 2024

(54) PUMP UNIT AND CHROMATOGRAPH

(71) Applicants: SHIMADZU CORPORATION, Kyoto (JP); Kyoto University, Kyoto (JP)

(72) Inventors: Jun Yanagibayashi, Kyoto (JP); Shinya Imamura, Kyoto (JP); Kenichi Yasunaga, Kyoto (JP); Yasushi Ishihama, Kyoto (JP); Koshi Imami, Kyoto (JP); Tomoya Niinae, Kyoto (JP); Yumi Komori, Kyoto (JP)

(73) Assignees: SHIMADZU CORPORATION, Kyoto (JP); Kyoto University, Kyoto (JP)

( * ) Notice: Subject to any disclaimer, the term of this patent is extended or adjusted under 35 U.S.C. 154(b) by 290 days.

(21) Appl. No.: 17/778,832

(22) PCT Filed: Nov. 5, 2020

(86) PCT No.: PCT/JP2020/041340
§ 371 (c)(1),
(2) Date: May 21, 2022

(87) PCT Pub. No.: WO2021/100474
PCT Pub. Date: May 27, 2021

(65) Prior Publication Data
US 2023/0010923 A1    Jan. 12, 2023

(30) Foreign Application Priority Data
Nov. 22, 2019 (JP) .................................. 2019-211764

(51) Int. Cl.
*G01N 30/32* (2006.01)
*G01N 30/14* (2006.01)
*G01N 30/02* (2006.01)

(52) U.S. Cl.
CPC ............. *G01N 30/32* (2013.01); *G01N 30/14* (2013.01); *G01N 2030/027* (2013.01); *G01N 2030/146* (2013.01); *G01N 2030/326* (2013.01)

(58) Field of Classification Search
CPC .. G01N 30/32; G01N 30/14; G01N 2030/027; G01N 2030/146; G01N 2030/326; G01N 30/34; B01D 29/01
See application file for complete search history.

(56) References Cited

U.S. PATENT DOCUMENTS 5,063,775 A * 11/1991 Walker, Sr. ........... E21B 47/009
                                                     73/152.52
8,313,476 B2   11/2012 Thompson et al.
(Continued)

FOREIGN PATENT DOCUMENTS

FR        1531510 A     7/1968
JP     57-184966 A    11/1982
(Continued)

OTHER PUBLICATIONS

Office Action in corresponding Chinese Patent Application No. 202080079755.9 dated Jul. 29, 2023, with English machine translation.
(Continued)

*Primary Examiner* — Tarun Sinha
(74) *Attorney, Agent, or Firm* — Renner, Otto, Boisselle & Sklar, LLP (57) ABSTRACT

A pump unit includes a pump and a metal ion trap. The pump includes a metal member that comes into contact with a mobile phase. The pump pumps a mobile phase through a flow path. The metal ion trap includes a filter element. The filter element includes a metal ion retention structure for retaining metal ions by interacting with the metal ions included in a mobile phase. The filter element is provided in
(Continued)

the flow path for a mobile phase pumped by the pump. The pump unit may be provided in a chromatograph.

9 Claims, 11 Drawing Sheets

(56) References Cited

U.S. PATENT DOCUMENTS

| | | | |
|---|---|---|---|
| 9,056,264 B2 | 6/2015 | Hahn et al. | |
| 9,201,049 B2 | 12/2015 | Beemer | |
| 9,316,324 B2 | 4/2016 | Berndt | |
| 9,494,563 B2 | 11/2016 | Falk-Jordan | |
| 10,018,604 B2 | 7/2018 | Burger et al. | |
| 2012/0014848 A1 | 1/2012 | Ellis et al. | |
| 2012/0160754 A1 | 6/2012 | Falk-Jordan | |
| 2014/0026647 A1 | 1/2014 | Ellis et al. | |
| 2014/0261838 A1 | 9/2014 | Beemer | |
| 2015/0308588 A1 | 10/2015 | Hahn et al. | |
| 2017/0045165 A1 | 2/2017 | Falk-Jordan | |
| 2018/0058612 A1 | 3/2018 | Hahn et al. | |
| 2019/0219923 A1* | 7/2019 | Kamimura | G03F 7/325 |
| 2020/0166486 A1* | 5/2020 | Yamaguchi | B01D 19/00 |

FOREIGN PATENT DOCUMENTS

| | | |
|---|---|---|
| JP | 2000-171451 A | 6/2000 |
| WO | 2019/008683 A1 | 1/2019 |

OTHER PUBLICATIONS

LCtalk Special Issue "Introduction to HPLC-part3", 2016, Special Issue X, p. 1-19 and its Machine Translation of p. 6, Fig. 2 and p. 7 "Filters"; 2016.

International Search Report for corresponding International Patent Application No. PCT/JP2020/041340, dated Jan. 26, 2021.

Written Opinion of the International Searching Authority for corresponding International Patent Application No. PCT/JP2020/041340 dated Jan. 26, 2021 (English language machine translation).

* cited by examiner

PUMP UNIT AND CHROMATOGRAPH

TECHNICAL FIELD

The present invention relates to a pump unit and a chromatograph.

BACKGROUND ART

Chromatographs have been known as analysis devices that separate a substance included in a sample into different components. For example, in a liquid chromatograph described in Patent Document 1, a solvent stored in a solvent supply source is pumped by a pump. Further, a sample to be analyzed is mixed with a solvent by a sampling unit and introduced into a separation device. The sample that has been introduced into the separation device is separated into components based on differences in chemical properties or composition and is detected by a detector. A chromatogram is produced by a data processing unit based on a result of detection by the detector.

Here, in a case in which a sample includes a compound such as a protein, a peptide, a nucleic acid or a specific type of pesticide, the compound interacts with metal to form a complex. Therefore, in a case in which a portion that comes into contact with a sample, such as a pipe in a liquid chromatograph, is formed of metal, adsorption of the sample on the contact portion occurs due to interaction between the metal and the sample. In this case, accuracy of a chromatogram to be produced may be degraded.

As such, in the liquid chromatograph of Patent Document 1, among pipes including an inner pipe and an outer pipe, the inner pipe that comes into contact with a sample is formed of a non-metallic material such as polyether ether ketone (PEEK). Patent Documents 2 to 7 also describe that a portion that comes into contact with a sample such as a pipe, a fitting or a syringe in a liquid chromatograph is formed of non-metal.

[Patent Document 1] U.S. Pat. No. 9,494,563 B2
[Patent Document 2] US 2012/0160754 A1
[Patent Document 3] U.S. Pat. No. 8,313,476 B2
[Patent Document 4] U.S. Pat. No. 10,018,604 B2
[Patent Document 5] U.S. Pat. No. 9,056,264 B2
[Patent Document 6] U.S. Pat. No. 9,201,049 B2
[Patent Document 7] U.S. Pat. No. 9,316,324 B2

SUMMARY OF INVENTION

Technical Problem

As described above, it is possible to prevent interaction between metal and a sample by forming a portion that comes into contact with the sample in a liquid chromatograph using a non-metallic material. On the other hand, in recent years, a liquid chromatograph is required to send liquid at high pressure equal to or larger than 40 MPa. However, according to the study of the inventors of the present invention, it has been found that it is difficult to prevent the interaction between metal and a sample while sending liquid at high pressure. In this case, analysis accuracy of a sample may be degraded.

An object of the present invention is to provide a pump unit and a chromatograph that can send liquid at high pressure while maintaining analysis accuracy of a sample.

Solution to Problem

One aspect of the present invention relates to a pump unit including a pump that pumps a mobile phase through a flow path, and a metal ion trap including a filter element provided in the flow path for a mobile phase pumped by the pump, wherein the pump includes a metal member that comes into contact with a mobile phase, and the filter element includes a metal ion retention structure for retaining metal ions by interacting with the metal ions included in a mobile phase.

One aspect of the present invention relates to a chromatograph including the above-mentioned pump unit, a sample supplier that supplies a sample to a mobile phase pumped by the pump of the pump unit, a separation column through which a sample supplied by the sample supplier passes, and a detector that detects a sample that has passed through the separation column, wherein the metal ion trap of the pump unit is provided between the pump and the sample supplier, and a portion that comes into contact with a mobile phase in each of the sample supplier, the separation column and the detector is formed of a non-metallic material.

Advantageous Effects of Invention

With the present invention, it is possible to send liquid feeding at high pressure while preventing degradation of analysis accuracy of a sample caused by interaction between metal and a sample.

DESCRIPTION OF EMBODIMENTS

(1) Configuration of Chromatograph

Figure 1:
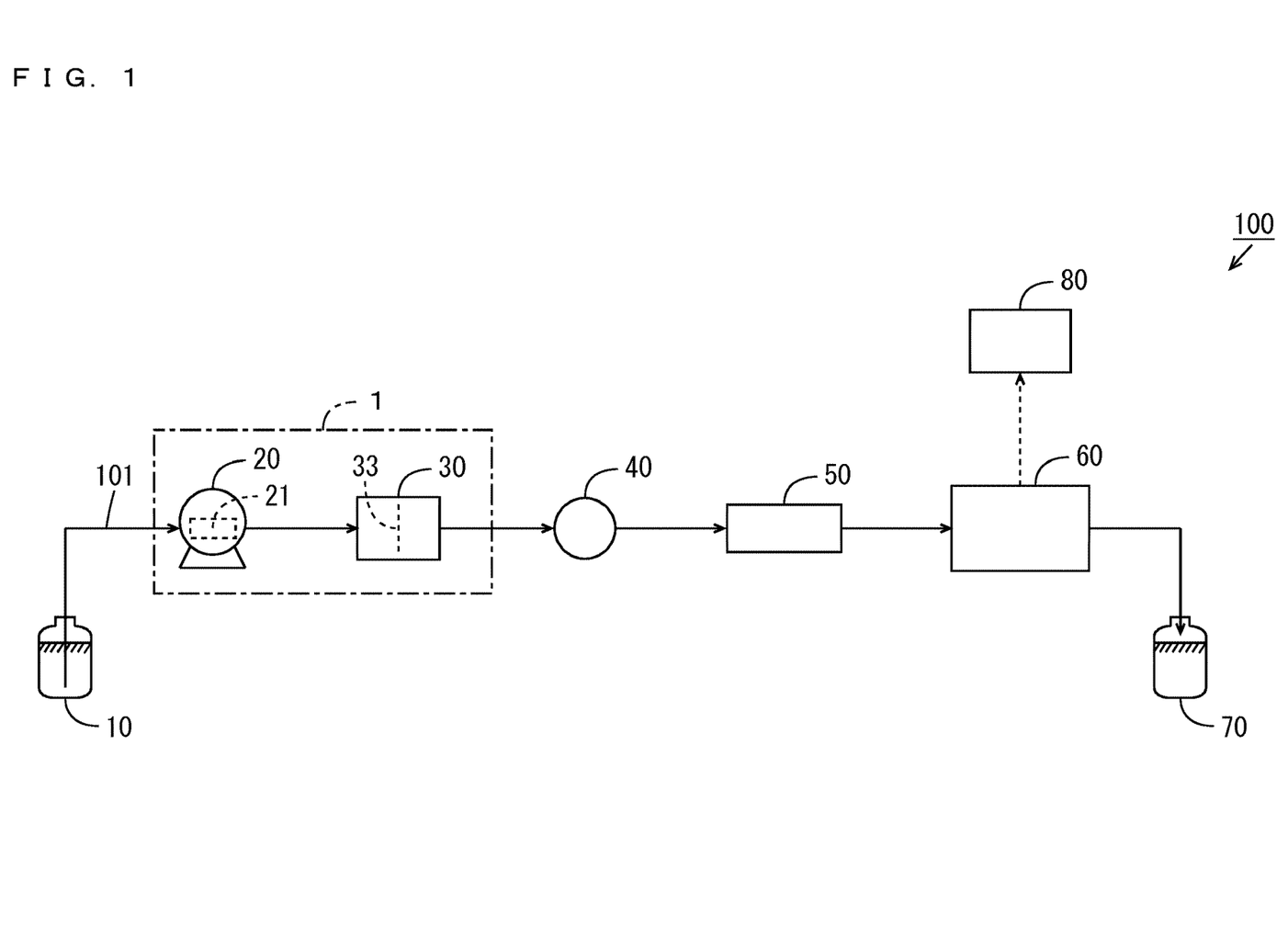
FIG. 1 is a diagram showing the configuration of the chromatograph according to one embodiment of the present invention.

A pump unit and a chromatograph according to embodiments of the present invention will be described below in detail with reference to the drawings. FIG. 1 is a diagram showing the configuration of the chromatograph according to one embodiment of the present invention. While being a liquid chromatograph, the chromatograph 100 in the present embodiment may be a supercritical fluid chromatograph.

As shown in FIG. 1, the chromatograph 100 includes a mobile phase container 10, a pump 20, a metal ion trap 30, a sample supplier 40, a separation column 50, a detector 60, a liquid waste container 70 and a processing device 80. The pump 20 and the metal ion trap 30 constitute the pump unit 1. The mobile phase container 10 stores an aqueous solution or an organic solvent as a mobile phase. In the following description, a portion that comes into contact with a mobile phase in the chromatograph 100 is referred to as a mobile phase contact portion.

For example, in the present embodiment, the pump 20 is a plunger pump and includes constituent elements such as a pump head, a plunger, a plunger seal, a suction check valve, a discharge check valve and a pressure sensor. Because a plunger pump is well known, a detailed description of the structure thereof will not be described. However, the constituent elements of the above-mentioned plunger pump and members that seal gaps between the constituent elements serve as mobile phase contact portions that come into contact with a mobile phase.

At least part of the mobile phase contact portions of the pump 20 includes a metal member 21 formed of a metallic material. Thus, the pump 20 can send liquid at a pressure equal to or larger than 40 MPa, and preferably at a pressure equal to or larger than 100 MPa. The pump 20 pumps a mobile phase stored in the mobile phase container 10 through the flow path 101. The flow path 101 is constituted by a plurality of joined pipes, for example, and has resistance to a pressure equal to or larger than 40 MPa, and preferably to a pressure equal to or higher than 100 MPa. The mobile phase contact portions of the flow path 101 may be formed of a non-metallic material.

The metal ion trap 30 is interposed in the portion between the pump 20 and the sample supplier 40 in the flow path 101, and retains metal ions eluted into a mobile phase led out from the pump 20 by a filter element 33. Details of the metal ion trap 30 will be described below. The sample supplier 40 is a sample injector, for example, and has resistance to a pressure equal to or larger than 40 MPa and preferably to a pressure equal to or larger than 100 MPa. The sample supplier 40 supplies a sample to be analyzed to a mobile phase that has passed through the metal ion trap 30. The mobile phase contact portions of the sample supplier 40 may be formed of a non-metallic material.

A sample supplied by the sample supplier 40 is mixed with a mobile phase and introduced into the separation column 50. The separation column 50 has resistance to a pressure equal to or larger than 40 MPa, and preferably to a pressure equal to or larger than 100 MPa, and retains sample components for different periods of time depending on the affinity between each sample component, and the separation column 50 and a mobile phase. The separation column 50 is stored in a column oven (not shown) and adjusted to a predetermined constant temperature. The mobile phase contact portions of the separation column 50 may be formed of a non-metallic material.

The detector 60 has resistance to a pressure equal to or larger than 40 MPa and preferably to a pressure equal to or larger than 100 MPa, and sequentially detects sample components eluted from the separation column 50 after a retention period of time in the separation column 50 has elapsed. The mobile phase contact portions of the detector 60 may be formed of a non-metallic material. The liquid waste container 70 stores a mobile phase and a sample that have passed through the detector 60 as liquid wastes. The processing device 80 generates a liquid chromatogram representing the relationship between the retention time of each component and a detection intensity by processing a result of detection by the detector 60.

(2) Structure of Metal Ion Trap

Figure 2:
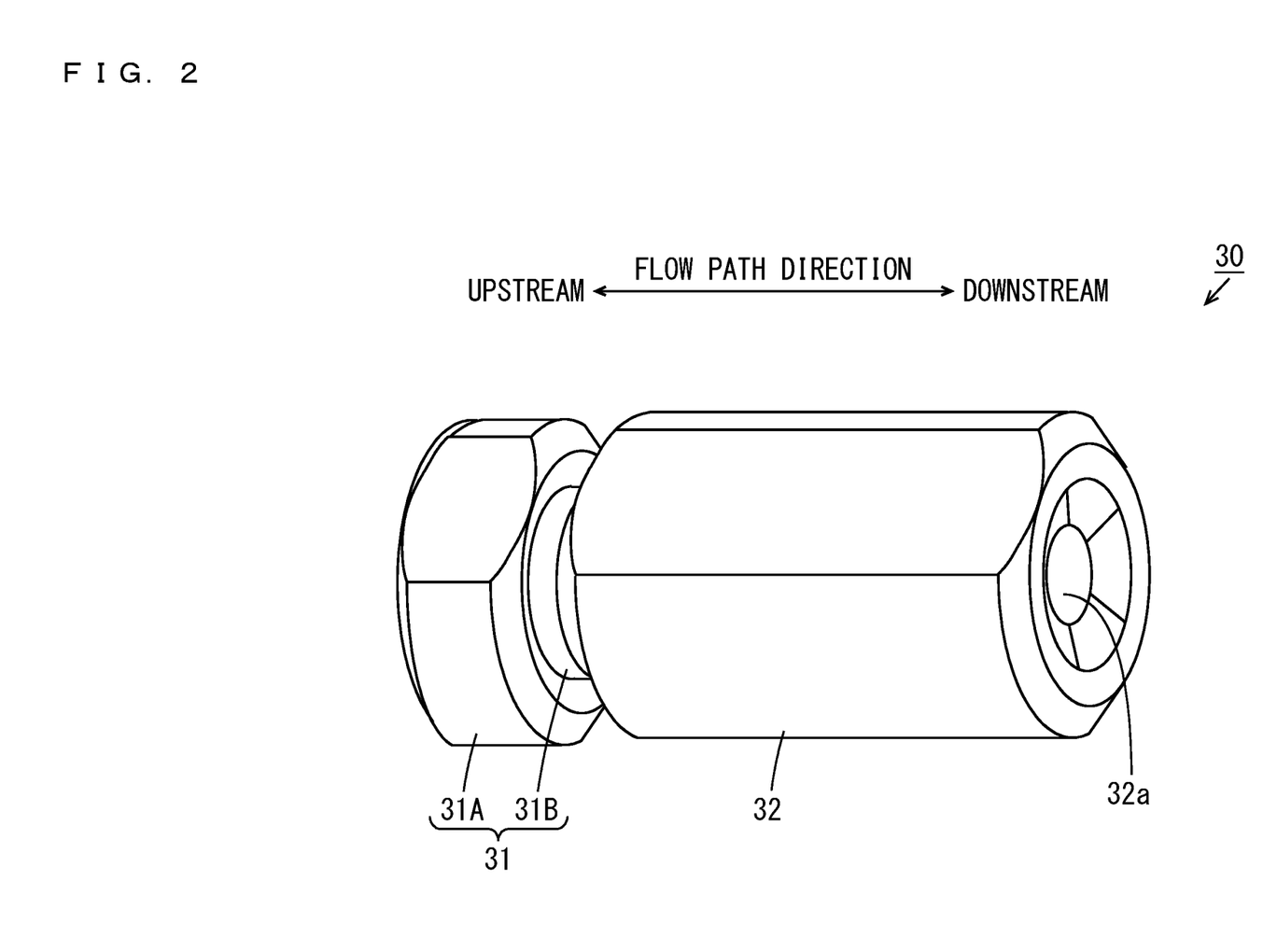
FIG. 2 is a perspective view showing the appearance of a metal ion trap.

FIG. 2 is a perspective view showing the appearance of the metal ion trap 30. The metal ion trap 30 is formed to allow a mobile phase to pass therethrough, and has a cylindrical outer shape extending parallel to a direction in which the mobile phase passes as shown in FIG. 2. Hereinafter, the direction parallel to the direction in which a mobile phase passes in the metal ion trap 30 is referred to as a flow path direction. Further, the direction in which a mobile phase flows in the flow path direction is defined as downstream, and its opposite direction is defined as upstream.

Figure 3:
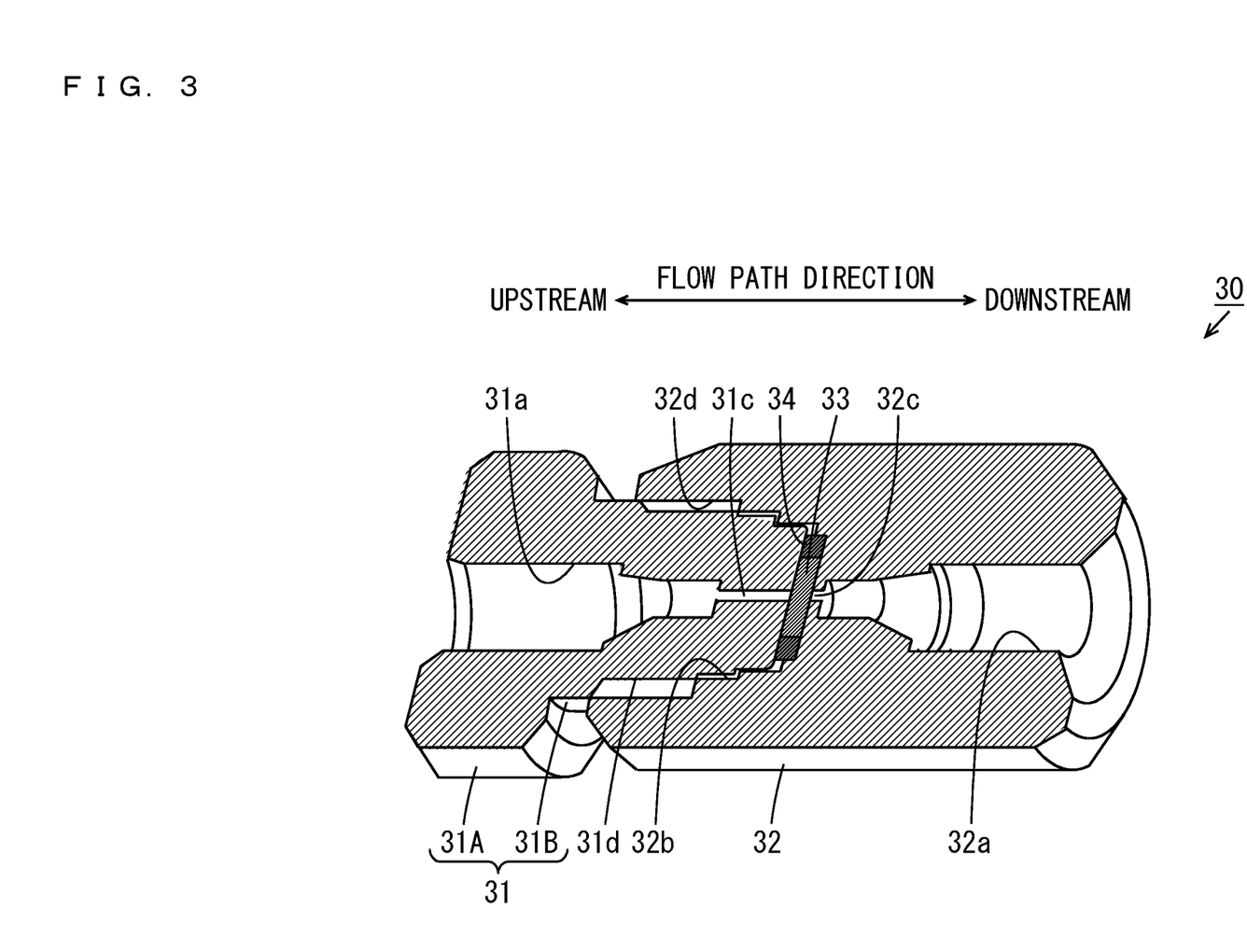
FIG. 3 is a perspective view showing the longitudinal cross section of the metal ion trap.

FIG. 3 is a perspective view showing the longitudinal cross section of the metal ion trap 30. As shown in FIG. 3, the metal ion trap 30 includes an upstream housing 31, a downstream housing 32, the filter element 33 and a seal member 34, and has resistance to a pressure equal to or larger than 40 MPa and preferably to a pressure equal to or larger than 100 MPa. The upstream housing 31 and the downstream housing 32 are examples of first and second housings, respectively. Each of the upstream housing 31 and the downstream housing 32 is formed of a non-metallic material such as PEEK (polyether ether ketone). The upstream housing 31 may be formed of a metallic material.

The upstream housing 31 is a male screw member, and has a head portion 31A and a shaft portion 31B projecting downstream from a center portion of the head portion 31A. In the upstream housing 31, a coupling hole 31a with a closed end that penetrates the head portion 31A in the flow path direction to reach the shaft portion 31B is formed. A pipe (hereinafter referred to as an upstream pipe) constituting the flow path 101 is coupled to the coupling hole 31a. Further, in the upstream housing 31, a liquid passing portion 31c which penetrates between the bottom surface of the coupling hole 31a and the downstream end surface of the shaft portion 31B and through which a mobile phase passes is formed. The coupling hole 31a and the liquid passing portion 31c are examples of a first opening. A screw portion 31d is formed on the outer peripheral surface of the substantially center portion in the flow path direction of the shaft portion 31B.

The downstream housing 32 is a female screw member. In the downstream housing 32, a coupling hole 32a with a closed end extending upstream from the downstream end surface is formed, and a coupling hole 32b with a closed end extending downstream from the upstream end surface is formed. One end portion of another pipe (hereinafter referred to as a downstream pipe) constituting the flow path 101 is coupled to the coupling hole 32a. Further, in the downstream housing 32, a liquid passing portion 32c which penetrates between the bottom surface of the coupling hole 32a and the bottom surface of the coupling hole 32b and through which a mobile phase passes is formed. The coupling hole 32a and the liquid passing portion 32c are examples of a second opening. A screw portion 32d corresponding to the screw portion 31d of the shaft portion 31B is formed on the inner peripheral surface of the coupling hole 32b.

The shaft portion 31B of the upstream housing 31 is coupled to the coupling hole 32b of the downstream housing 32 such that the screw portions 31d, 32d are engaged with each other. In this case, the liquid passing portion 31c and the liquid passing portion 32c overlap with each other in the flow path direction. The filter element 33 is arranged between the downstream end surface of the shaft portion 31B and the bottom surface of the coupling hole 32b so as to intersect with the portion between the liquid passing portions 31c, 32c. A mobile phase flowing from a pipe coupled to the coupling hole 31a of the upstream housing 31 passes through the liquid passing portion 31c and the filter element 33 in this order. A mobile phase that has passed through the filter element 33 flows out from a pipe coupled to the coupling hole 32a of the downstream housing 32.

The filter element 33 is a metal ion trap filter, and has a metal ion retention structure that retains metal ions by interacting with metal ions included in a mobile phase in the surface that comes into contact with the mobile phase. Specifically, the metal retention structure includes a functional group that forms a complex with metal ions. In this case, the filter element 33 can efficiently retain metal ions by forming a complex with the metal ions.

The filter element 33 may be a membrane in which an adsorptive resin carrier is bonded to a porous resin such as polytetrafluoroethylene. Alternatively, the filter element 33 may be a column member filled with a particulate adsorptive resin carrier. An adsorptive resin carrier is a chelate resin including a functional group such as iminodiacetic acid which forms a complex with metal ions, for example. In this case, the filter element 33 can retain metal ions by interaction of a functional group such as iminodiacetic acid of a chelate resin with the metal ions.

The seal member 34 is an annular packing, for example, and is arranged between the downstream end surface of the shaft portion 31B and the bottom surface of the coupling hole 32b so as to surround the filter element 33. The seal member 34 seals between the upstream housing 31 and the downstream housing 32 such that a mobile phase that has passed through the liquid passing portion 31c does not leak from the coupling hole 32b.

With the above-mentioned configuration, the filter element 33 can be held in the flow path 101 by the upstream housing 31 and the downstream housing 32. Further, because the portion of the downstream housing 32 that comes into contact with a mobile phase is formed of a non-metallic material, metal ions are prevented from being eluted from the metal ion trap 30 into the mobile phase at a position farther downstream than the filter element 33.

(3) Removal Device

Figure 4:
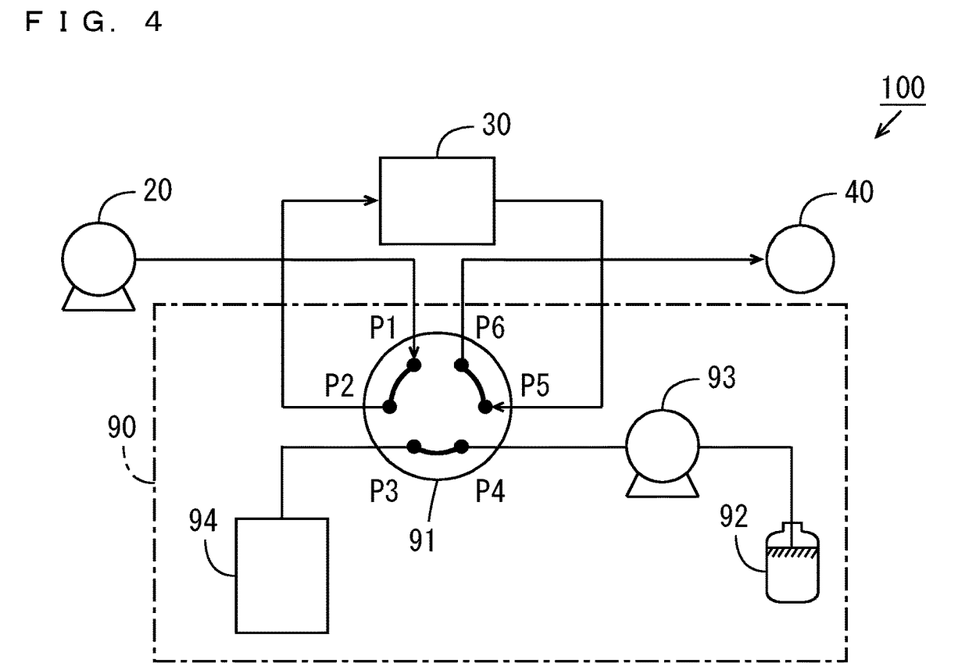
FIG. 4 is a schematic view showing one example of a removal device.
Figure 5:
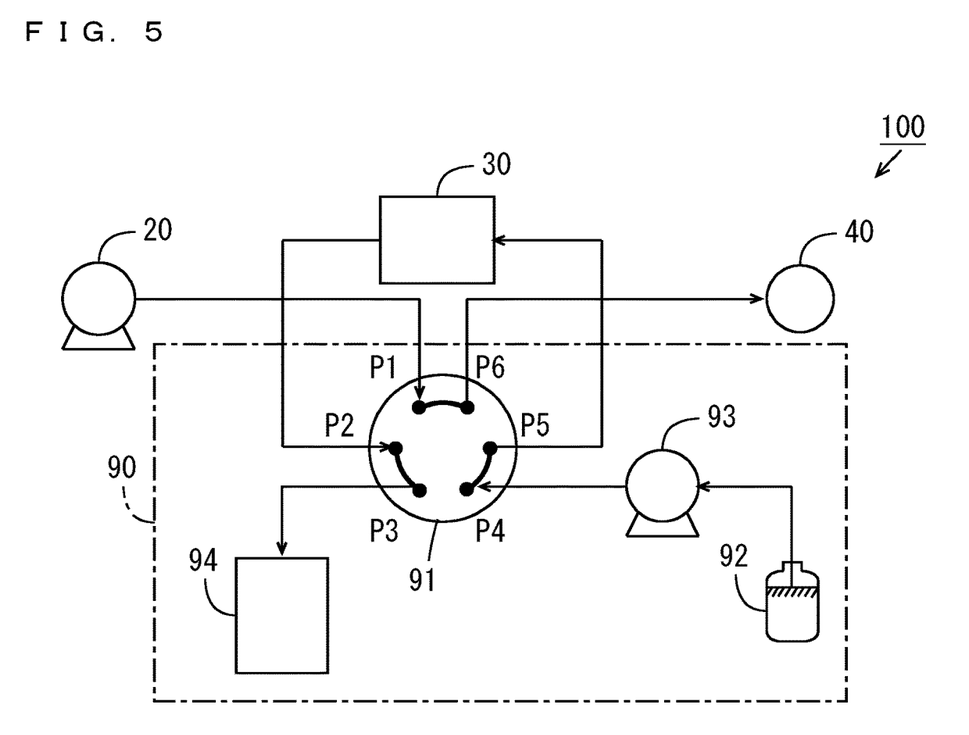
FIG. 5 is a schematic view showing one example of the removal device.

Since the retention capacity of the metal ion trap 30 for metal ions is limited, the metal ion trap 30 cannot retain metal ions an amount of which is equal to or larger than a certain amount. As such, the chromatograph 100 may further include a removal device for removing retained metal ions from the metal ion trap 30. FIGS. 4 and 5 are schematic views showing one example of the removal device. As shown in FIGS. 4 and 5, the removal device 90 includes a flow path switching valve 91, a removal liquid container 92, a pump 93 and a drain 94.

The flow path switching valve 91 has six ports P1 to P6 and is switchable between a first flow path state and a second flow path state. In the first flow path state, the ports P1, P2 communicate with each other, the ports P3, P4 communicate with each other, and the ports P5, P6 communicate with each other. In the second flow path state, the ports P2, P3 communicate with each other, the ports P4, P5 communicate with each other, and the ports P6, P1 communicate with each other.

The port P1 is connected to the outlet port of the pump 20. The port P2 is connected to an upstream pipe connected to the metal ion trap 30. The port P3 is connected to the drain 94. The port P4 is connected to the outlet port of the pump 93. The port P5 is connected to the downstream pipe connected to the metal ion trap 30. The port P6 is connected to the sample supplier 40.

The removal liquid container 92 stores an acid solvent such as dilute nitric acid as a removal liquid. The pump 93 pumps the removal liquid stored in the removal liquid container 92 to the flow path switching valve 91. The drain 94 discharges the liquid that has flown from the flow path switching valve 91 to the outside of the chromatograph 100.

As shown in FIG. 4, during an analysis of a sample, the flow path switching valve 91 is in the first flow path state. In this case, a mobile phase that has flown from the pump 20 is guided to the metal ion trap 30 through the ports P1, P2. The mobile phase that has passed through the metal ion trap 30 is guided to the sample supplier 40 through the ports P5, P6. On the other hand, during an analysis of a sample, the pump 93 does not operate.

As shown in FIG. 5, during removal of metal ions, the flow path switching valve 91 is in the second flow path state. In this case, the removing liquid that has flown from the pump 93 is guided to the metal ion trap 30 through the ports P4, P5. The removal liquid that has passed through the metal ion trap 30 is guided to the drain 94 through the ports P2, P3. On the other hand, during removal of metal ions, the pump 20 does not operate.

With this configuration, the metal ions retained in the metal ion trap 30 are released by the removal liquid and discharged from the drain 94 together with the removal liquid. Thus, the chromatograph 100 can be continuously used without replacement of the metal ion trap 30.

After the metal ions are removed, a cleaning liquid such as pure water may be supplied from the pump 93 to the flow path 101 such that the removal liquid remaining in the flow path 101 is discharged. While the removal liquid is guided to the metal ion trap 30 in the opposite direction to the direction in which the mobile phase flows in the examples of FIGS. 4 and 5, the embodiment is not limited to this. The removal liquid may be guided to the metal ion trap 30 in the same direction as the direction in which the mobile phase flows.

(4) Effects

In the chromatograph 100 according to the present embodiment, a mobile phase is pumped by the pump 20 through the flow path 101. Because the pump 20 includes the metal member 21 that comes into contact with a mobile phase, the metal member 21 has sufficiently high mechanical strength. Therefore, the pump 20 can send liquid at high pressure. Further, the filter element 33 of the metal ion trap 30 is provided in the flow path 101 for a mobile phase pumped by the pump 20. The filter element 33 includes the metal ion retention structure for retaining metal ions by interacting with metal ions included in a mobile phase.

With this configuration, even in a case in which metal ions are eluted from the metal member 21 of the pump 20 into a mobile phase, the metal ions are retained by the metal ion trap 30. Further, the mobile phase contact portion of each of the sample supplier 40, the separation column 50 and the detector 60 located at positions farther downstream than the metal ion trap 30 is made of a non-metallic material. Therefore, metal ions hardly interact with the material of the flow path 101 at a position farther downstream than the metal ion trap 30.

This suppresses an occurrence of a phenomenon that may degrade analysis accuracy such as adsorption of metal ions, peak tailing of a chromatogram, a change in retention characteristics of the separation column 50 or a change in detection characteristics of the detector 60. As a result, it is possible to send liquid at high pressure while preventing degradation of analysis accuracy of a sample.

(5) Modified Examples

Figure 6:
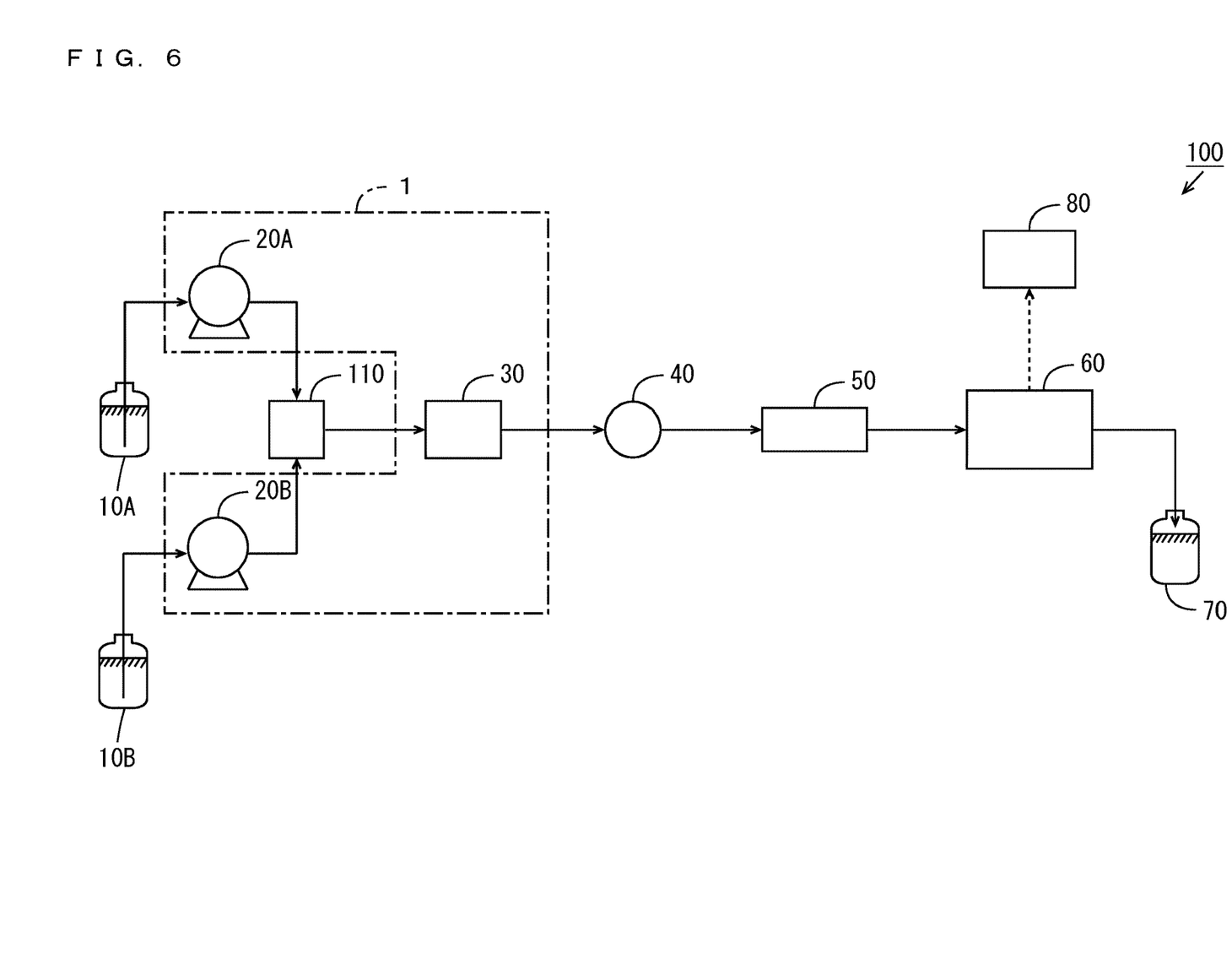
FIG. 6 is a diagram showing the configuration of a chromatograph according to a first modified example.

Differences from the chromatograph 100 of FIG. 1 will be described below in regard to various chromatographs 100 according to modified examples. FIG. 6 is a diagram showing the configuration of a chromatograph 100 according to a first modified example. As shown in FIG. 6, the chromatograph 100 of the present example is used for a high-pressure gradient analysis and further includes a mixer 110. Further, the chromatograph 100 of the present example is provided with two mobile phase containers 10 and two pumps 20. The two mobile phase containers 10 are referred to as mobile phase containers 10A, 10B, respectively, and the two pumps 20 are referred to as pumps 20A, 20B, respectively.

The mobile phase container 10A stores an organic solvent as a mobile phase, for example. The mobile phase container 10B stores an aqueous solution as a mobile phase, for example. The pump 20A pumps the mobile phase stored in the mobile phase container 10A. The pump 20B pumps the mobile phase stored in the mobile phase container 10B. The mixer 110 is a mixer, for example, and mixes the mobile phases pumped by the pumps 20A, 20B at high pressure. A mobile phase contact portion of the mixer 110 may be formed of a metallic material.

A metal ion trap 30 is arranged between the mixer 110 and a sample supplier 40 and retains metal ions eluted into a mobile phase obtained by mixing by the mixer 110. In the present example, a pump unit 1 is constituted by pumps 20A, 20B and the metal ion trap 30. A mobile phase that has passed through the metal ion trap 30 is guided to the sample supplier 40.

Figure 7:
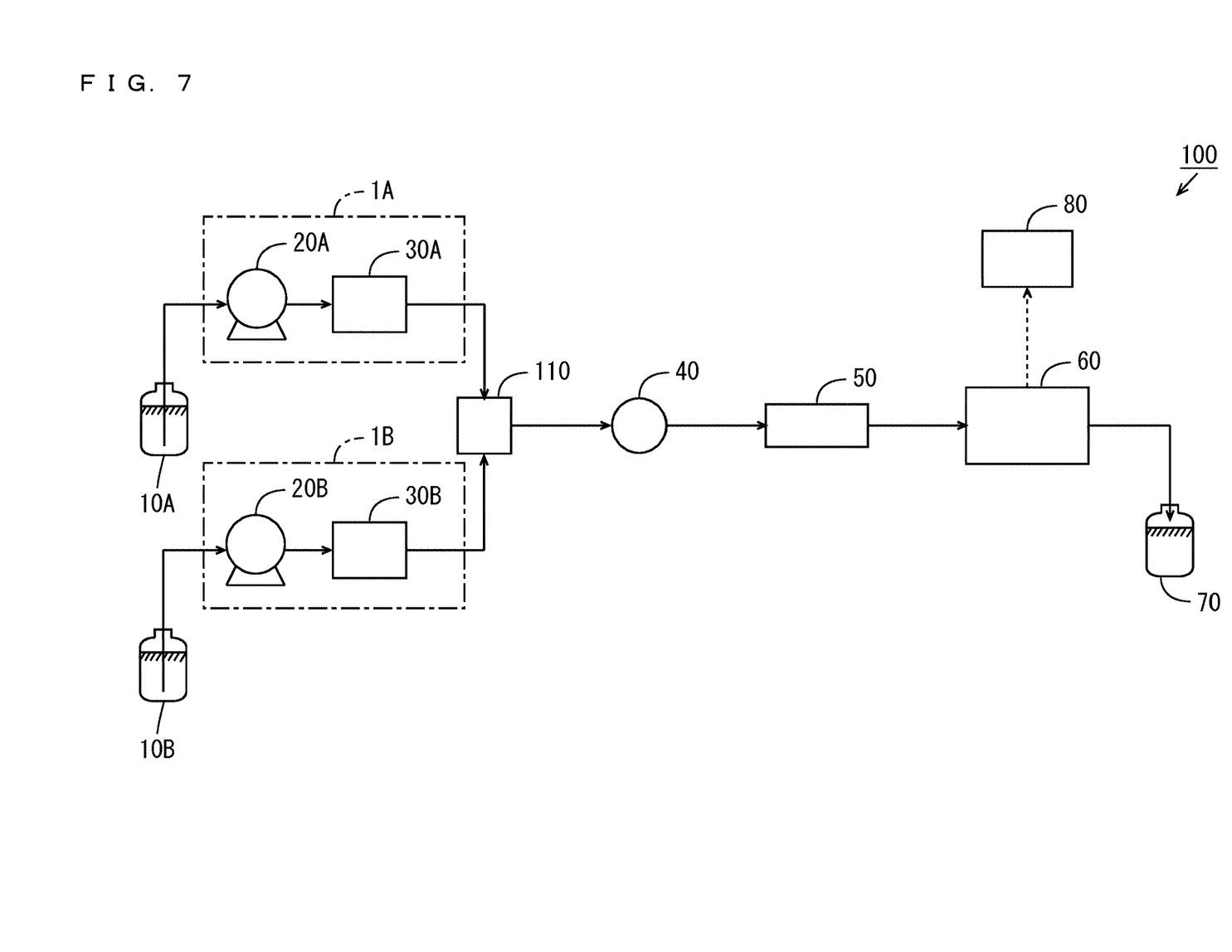
FIG. 7 is a diagram showing the configuration of a chromatograph according to a second modified example.

FIG. 7 is a diagram showing the configuration of a chromatograph 100 according to a second modified example. As shown in FIG. 7, the chromatograph 100 of the present embodiment is provided with two metal ion traps 30 and is provided with two mobile phase containers 10A, 10B, two pumps 20A, 20B and a mixer 110, which are similar to those of the first modified example. The two metal ion traps 30 are referred to as metal ion traps 30A, 30B, respectively.

The metal ion trap 30A is arranged between the pump 20A and the mixer 110 and retains metal ions eluted into a mobile phase led out from the pump 20A. The metal ion trap 30B is arranged between the pump 20B and the mixer 110 and retains metal ions eluted into a mobile phase led out from the pump 20B. In the present example, the pump 20A and the metal ion trap 30A constitute one pump unit 1A, and the pump 20B and the metal ion trap 30B constitute one pump unit 1B.

The mixer 110 mixes mobile phases that have passed through the metal ion traps 30A, 30B at high pressure. A mobile phase contact portion of the mixer 110 are formed of a non-metallic material. A mobile phase obtained by mixing by the mixer 110 is guided to the sample supplier 40. In the present example, two removal devices 90 (see FIGS. 4 and 5) respectively corresponding to the metal ion traps 30A, 30B may be provided.

Figure 8:
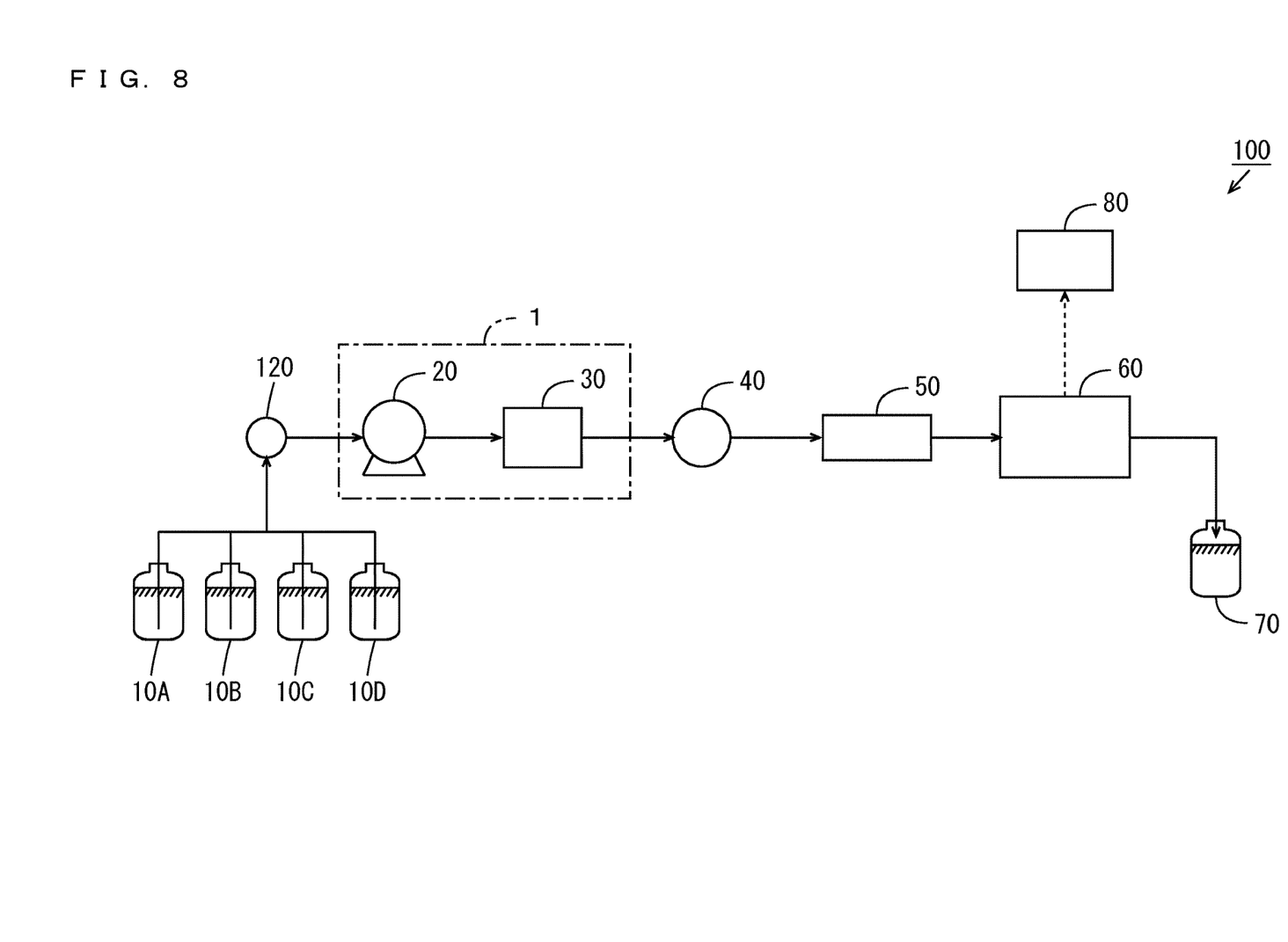
FIG. 8 is a diagram showing the configuration of a chromatograph according to a third modified example.

FIG. 8 is a diagram showing the configuration of a chromatograph 100 according to a third modified example. As shown in FIG. 8, the chromatograph 100 of the present example is used for a low-pressure gradient analysis and further includes a mixer 120. Further, the chromatograph 100 of the present example is provided with four mobile phase containers 10. The four mobile phase containers 10 are referred to as mobile phase containers 10A to 10D, respectively.

The mobile phase containers 10A to 10D respectively store different mobile phases. The mixer 120 is a proportional mixing valve, for example, and selectively sucks mobile phases stored in the mobile phase containers 10A to 10D and mixes them at low pressure. A mobile phase contact portion of the mixer 120 may be formed of a metallic material. A pump 20 pumps a mobile phase obtained by mixing by the mixer 120. A metal ion trap 30 is arranged between the pump 20 and a sample supplier 40 and retains metal ions eluted into a mobile phase led out from the pump 20. A mobile phase that has passed through the metal ion trap 30 is guided to the sample supplier 40.

In this manner, also in the first to third modified examples, the mobile phase contact portions of the pump 20 and the like located at positions farther downstream than the metal ion trap 30 may be formed of a non-metallic material. On the other hand, the mobile phase contact portions of the sample supplier 40, the separation column 50, the detector 60 and the like located at positions farther upstream than the metal ion trap 30 are formed of a metallic material. Therefore, a mobile phase that has passed through the metal ion trap 30 hardly includes metal ions. This suppresses interaction of a compound included in a sample with metal ions.

(6) Comparative Example and Inventive Example

In each of the following comparative example and inventive example, a pump 20 in which a mobile phase contact portion was formed of an α+β Ti alloy, a Co—Ni alloy and a stainless steel alloy was prepared. Further, 0.5% aqueous acetic acid was prepared as a mobile phase. Further, in the comparative example, a metal ion trap 30 is not provided at a position farther downward than a pump 20, and a mobile phase was pumped by the pump 20 at a flow rate of 2.5 µL/min. Further, 3 mL or more of a mobile phase led out from the pump 20 was successively collected three times as a sample.

Thereafter, in the inventive example, with the metal ion trap 30 provided at a position farther downstream than the pump 20, a mobile phase was pumped by the pump 20 at the flow rate of 2.5 µL/min. Further, 3 mL or more of a mobile phase led out from the pump 20 was successively collected three times as a sample. A filter element 33 of the metal ion trap 30 was created by formation of an Empore (registered trademark) disk chelate manufactured by 3M (registered trademark) into a circle a radius φ of which is 3.2 mm. The filter element 33 was cleaned in advance with methanol, dilute nitric acid and pure water.

1 mL was taken from each of the samples collected in the comparative example and the inventive example and diluted 10-fold, and then the concentration of metal ions included in each sample was measured with use of an ICP-MS (Inductively Coupled Plasma Mass Spectrometer (ICPMS-2030 manufactured by Shimadzu Corporation). As a result, ions of each of Ti (titanium), Co (cobalt), Fe (iron), V (vanadium), Ni (nickel), Cr (chromium) and Al (aluminum) were mainly detected. Here, Ti, V and Al are derived from an α+β type Ti alloy. Co is derived from a Co—Ni alloy. Fe and Cr are derived from a stainless steel alloy. Ni is derived from both of a Co—Ni alloy and a stainless steel alloy.

Figure 9:
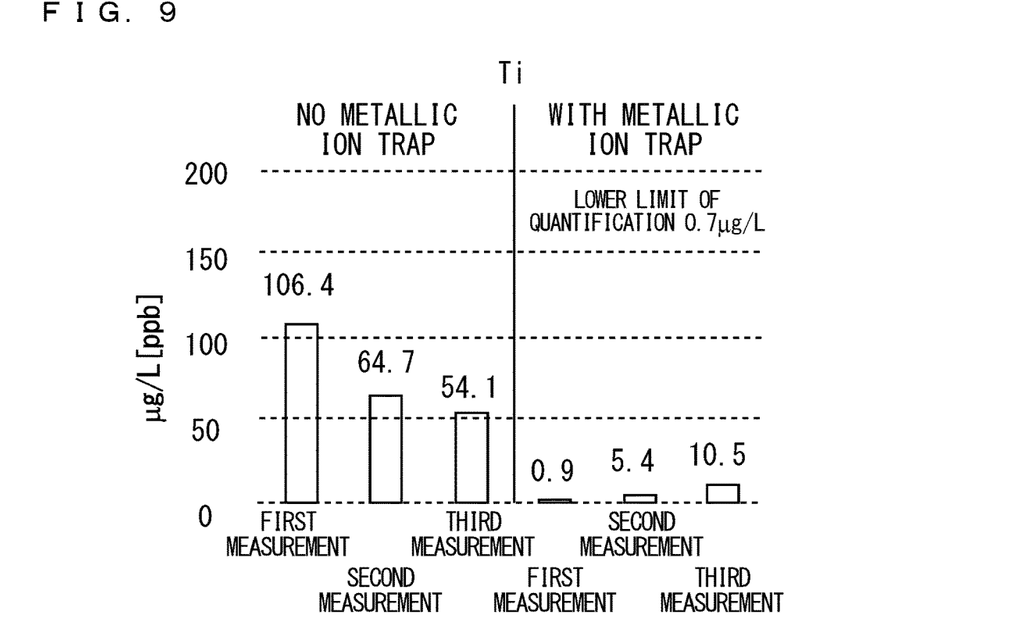
FIG. 9 is a graph showing the measurement results of the ion concentration of Ti in a comparative example and an inventive example.

FIG. 9 is a graph showing the measurement results of the ion concentration of Ti in the comparative example and the inventive example. As shown in FIG. 9, the ion concentrations of Ti for the first, second and third measurements in the comparative example were 106.4 µg/L, 64.7 µg/L and 54.1 µg/L, respectively. The ion concentrations of Ti in the first, second and third measurements in the inventive example were 0.9 µg/L, 5.4 µg/L and 10.5 µg/L, respectively. The lower limit of quantification of the ion concentration of Ti by ICP-MS is 0.7 µg/L.

Figure 10:
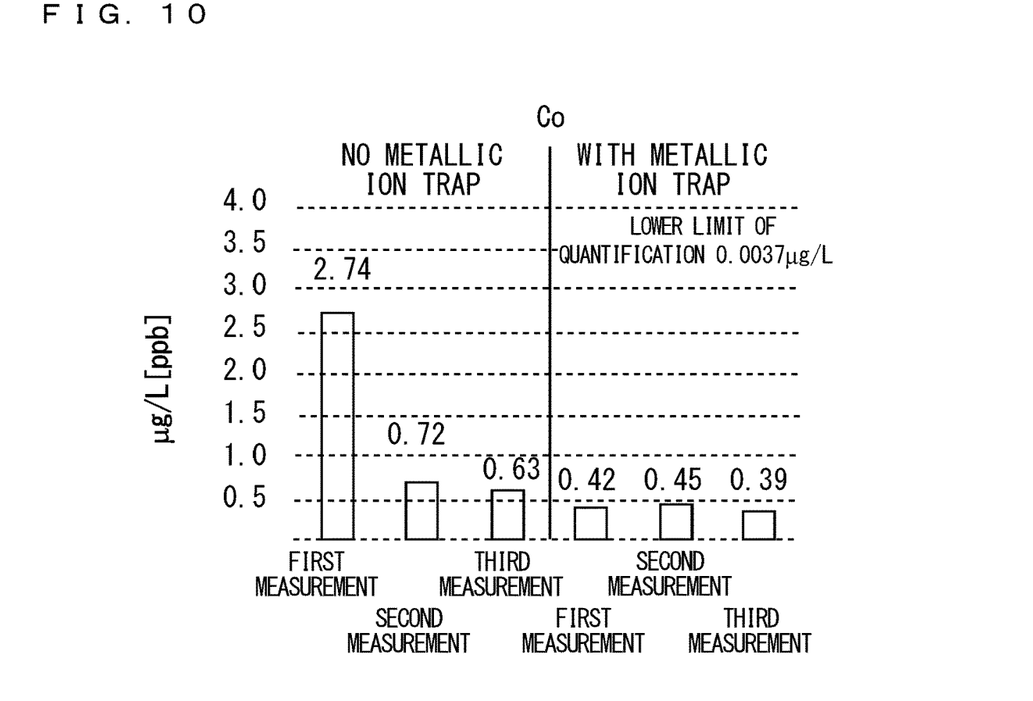
FIG. 10 is a graph showing the measurement results of the ion concentration of Co in the comparative example and the inventive example.

FIG. 10 is a graph showing the measurement results of the ion concentration of Co in the comparative example and the inventive example. As shown in FIG. 10, the ion concentrations of Co for the first, second and third measurements in the comparative example were 2.74 µg/L, 0.72 µg/L and 0.63 µg/L, respectively. The ion concentrations of Co in the first, second and third measurements in the inventive example were 0.42 µg/L, 0.45 µg/L and 0.39 µg/L, respectively. The lower limit of quantification of the ion concentration of Co by ICP-MS is 0.0037 µg/L.

Figure 11:
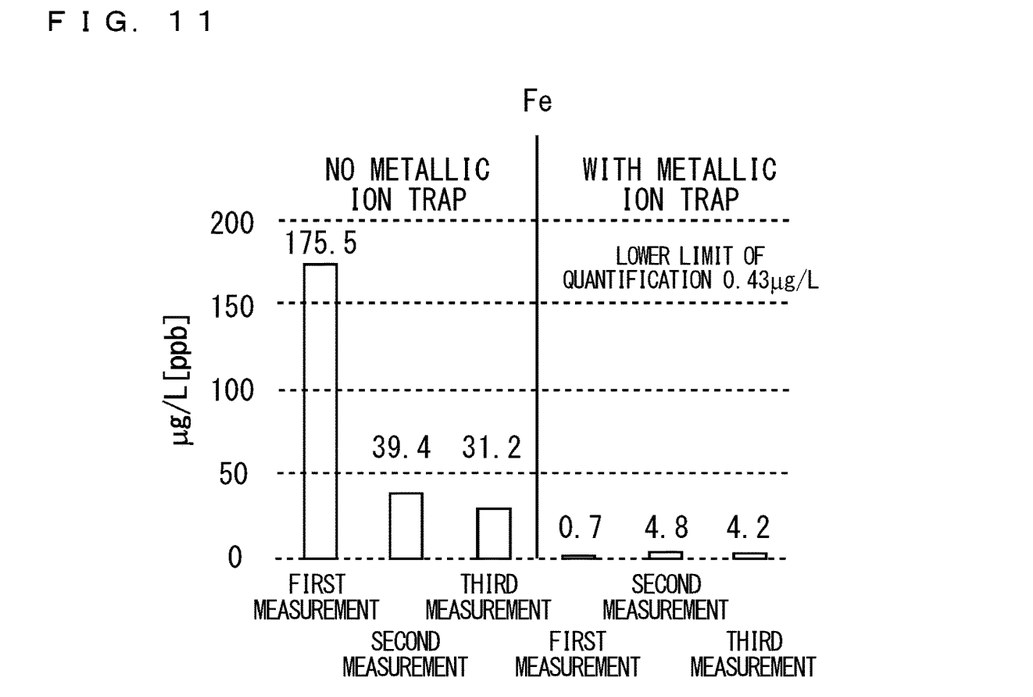
FIG. 11 is a graph showing the measurement results of the ion concentration of Fe in the comparative example and the inventive example.

FIG. 11 is a graph showing the measurement results of the ion concentration of Fe in the comparative example and the inventive example. As shown in FIG. 11, the ion concentrations of Fe for the first, second and third measurements in the comparative example were 175.5 µg/L, 39.4 µg/L and 31.2 µg/L, respectively. The ion concentrations of Fe in the first, second and third measurements in the inventive example were 0.7 µg/L, 4.8 µg/L and 4.2 µg/L, respectively. The lower limit of quantification of the ion concentration of Fe by ICP-MS is 0.43 µg/L.

Figure 12:
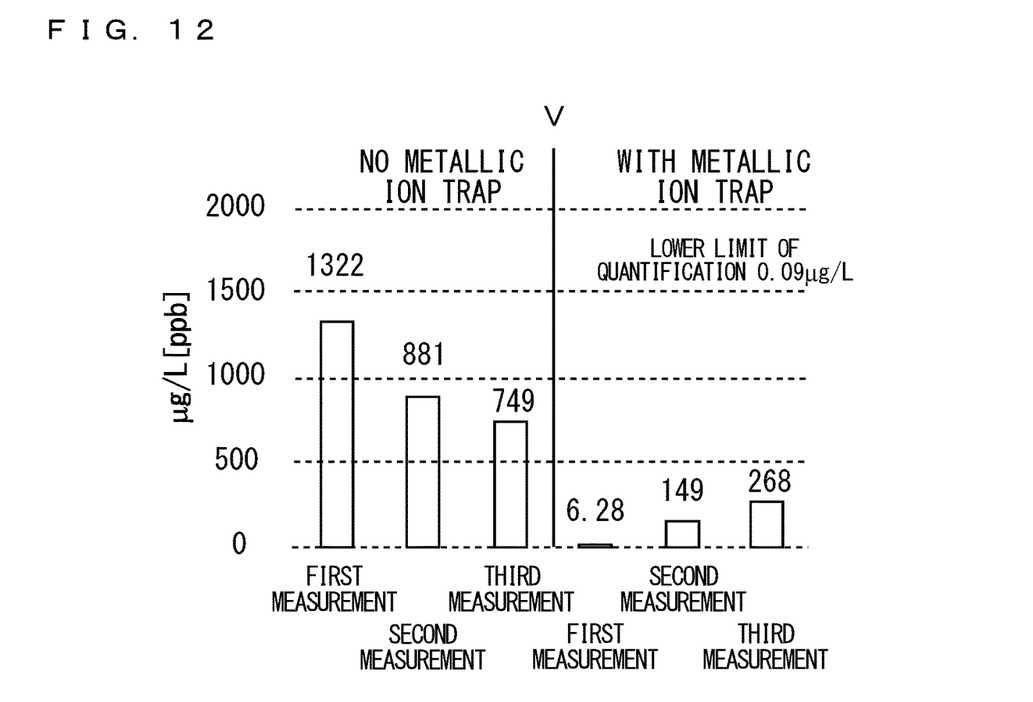
FIG. 12 is a graph showing the measurement results of the ion concentration of V in the comparative example and the inventive example.

FIG. 12 is a graph showing the measurement results of the ion concentration of V in the comparative example and the inventive example. As shown in FIG. 12, the ion concentrations of V for the first, second and third measurements in the comparative example were 1322 µg/L, 881 µg/L and 749 µg/L, respectively. The ion concentrations of V in the first, second and third measurements in the inventive example were 6.28 µg/L, 149 µg/L and 268 µg/L, respectively. The lower limit of quantification of the ion concentration of V by ICP-MS is 0.09 µg/L.

Figure 13:
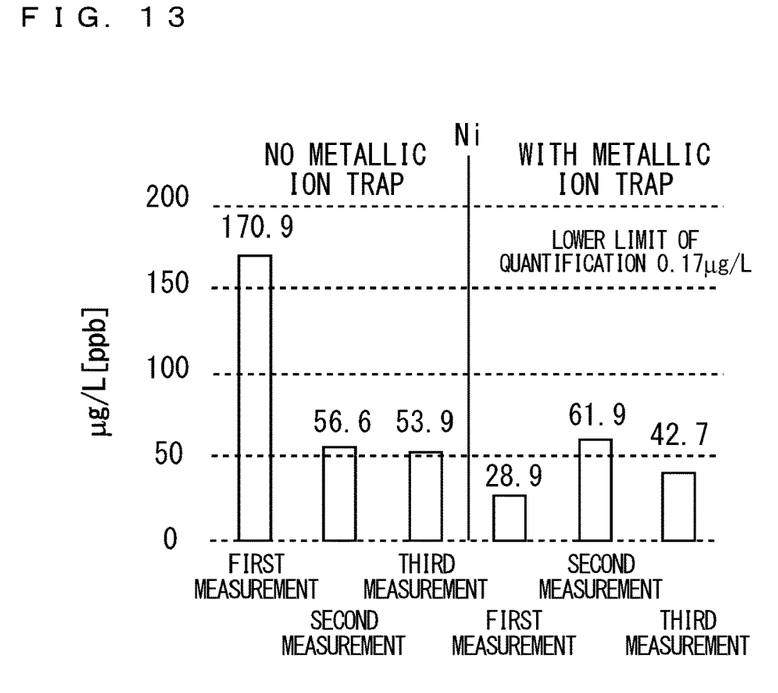
FIG. 13 is a graph showing the measurement results of the ion concentration of Ni in the comparative example and the inventive example.

FIG. 13 is a graph showing the measurement results of the ion concentration of Ni in the comparative example and the inventive example. As shown in FIG. 13, the ion concentrations of Ni for the first, second and third measurements in the comparative example were 170.9 µg/L, 56.6 µg/L and 53.9 µg/L, respectively. The ion concentrations of Ni in the first, second and third measurements in the inventive example were 28.9 µg/L, 61.9 µg/L and 42.7 µg/L, respectively. The lower limit of quantification of the ion concentration of Ni by ICP-MS is 0.17 µg/L.

Figure 14:
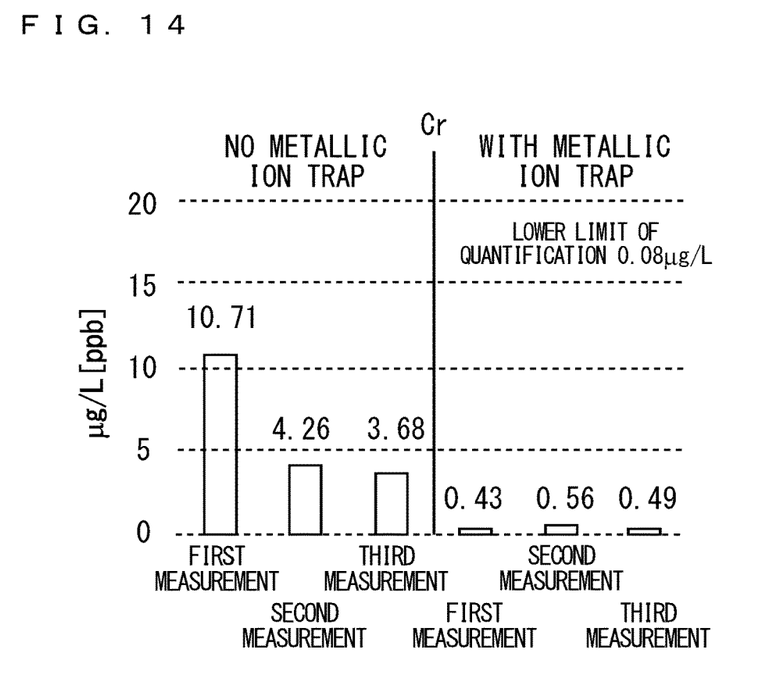
FIG. 14 is a graph showing the measurement results of the ion concentration of Cr in the comparative example and the inventive example.

FIG. 14 is a graph showing the measurement results of the ion concentration of Cr in the comparative example and the inventive example. As shown in FIG. 14, the ion concentrations of Cr for the first, second and third measurements in the comparative example were 10.71 µg/L, 4.26 µg/L and 3.68 µg/L, respectively. The ion concentrations of Cr in the first, second and third measurements in the inventive example were 0.43 µg/L, 0.56 µg/L and 0.49 µg/L, respectively. The lower limit of quantification of the ion concentration of Cr by ICP-MS is 0.08 µg/L.

Figure 15:
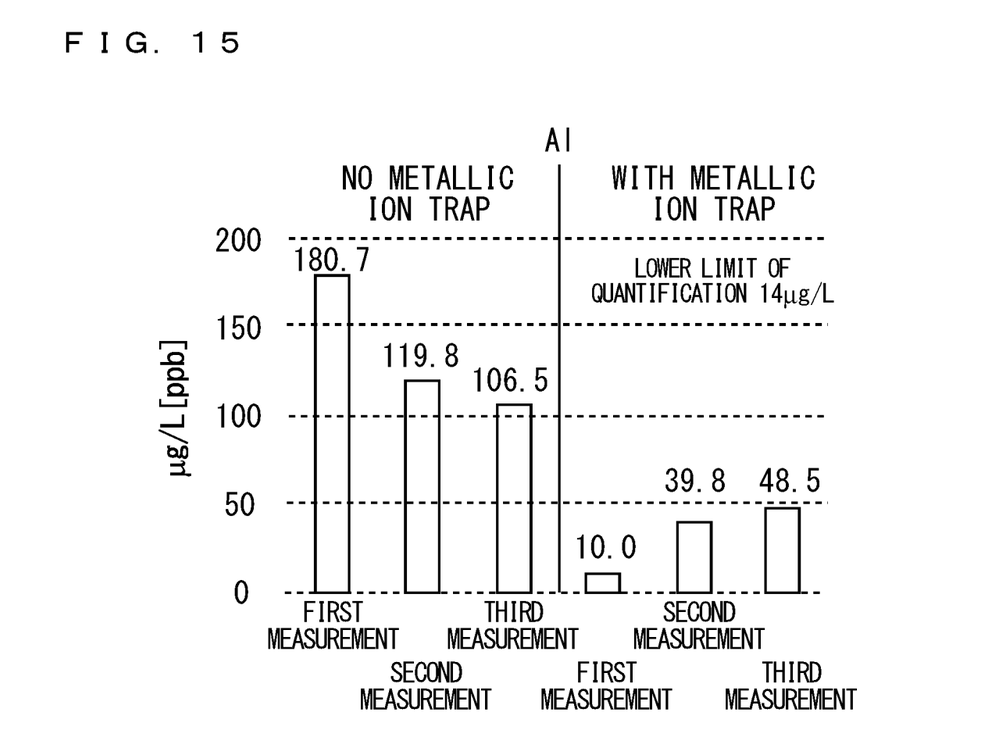
FIG. 15 is a graph showing the measurement results of the ion concentration of Al in the comparative example and the inventive example.

FIG. 15 is a graph showing the measurement results of the ion concentration of Al in the comparative example and the inventive example. As shown in FIG. 15, the ion concentrations of Al for the first, second and third measurements in the comparative example were 180.7 µg/L, 119.8 µg/L and 106.5 µg/L, respectively. The ion concentrations of Al in the first, second and third measurements in the inventive example were 10.0 µg/L, 39.8 µg/L and 48.5 µg/L, respectively. The lower limit of quantification of the ion concentration of Al by ICP-MS is 14 µg/L.

From the results of comparison between the comparative example and the inventive example, it was confirmed that the concentration of metal ions in a mobile phase derived from the pump 20 tended to decrease by provision of the metal ion trap 30 at a position farther downstream than the pump 20.

(7) Aspects

A member that comes into contact with liquid to be sent in the pump is required to have high mechanical strength. Therefore, in a case in which the member is formed of a non-metallic material, liquid cannot be sent at high pressure due to insufficient mechanical strength of the member. In a case in which the member is formed of a metallic material, because the member has sufficient mechanical strength, liquid can be sent at high pressure. However, in a case in which the member is formed of a metallic material, metal ions may be eluted from the metallic material into liquid. In this case, metal ions in the liquid may interact with a compound of a sample at a downstream position, so that adsorption, a change in retention characteristics of the separation column, a change in detection characteristics of the detector or the like may occur. This may degrade the analysis accuracy of a sample.

Based on these findings, the inventors of the present invention have found the configuration for enabling liquid sending at high pressure while maintaining analysis accuracy of a sample and have hit upon the following present invention. It is understood by those skilled in the art that the plurality of above-mentioned illustrative embodiments are specific examples of the below-mentioned aspects.

(Item 1) A pump unit according to one aspect may include a pump that pumps a mobile phase through a flow path, and a metal ion trap including a filter element provided in the flow path for a mobile phase pumped by the pump, wherein the pump may include a metal member that comes into contact with a mobile phase, and the filter element may include a metal ion retention structure for retaining metal ions by interacting with the metal ions included in a mobile phase.

In this pump unit, a mobile phase is pumped through the flow path by the pump. Because the pump includes the metal member that comes into contact with a mobile phase, the metal member has sufficiently high mechanical strength. Therefore, the pump can send liquid at high pressure. Further, the filter element of the metal ion trap is provided in the flow path for a mobile phase pumped by the pump. The filter element includes a metal ion retention structure for retaining metal ions by interacting with the metal ions included in a mobile phase.

With this configuration, even in a case in which metal ions are eluted from the metal member of the pump into a mobile phase, the metal ions are retained by the metal ion trap. Therefore, the metal ions hardly interact with a material of the flow path at a position farther downstream than the metal ion trap. This suppresses an occurrence of a phenomenon that may degrade analysis accuracy such as adsorption of metal ions on the flow path. As a result, it is possible to send liquid at high pressure while preventing degradation of analysis accuracy of a sample.

(Item 2) The pump unit according to item 1, wherein the metal ion retention structure may include a functional group that forms a complex with metal ions.

In this case, the filter element can efficiently retain metal ions by forming a complex with the metal ions.

(Item 3) The pump unit according to item 1 or 2, wherein the filter element may include a membrane in which an adsorptive resin carrier is bonded.

In this case, the filter element can efficiently retain metal ions by interacting with the metal ions to form a complex.

(Item 4) The pump unit according to item 1 or 2, wherein the filter element may include a column member filled with an adsorptive resin carrier.

In this case, the filter element can efficiently retain metal ions by interacting with the metal ions to form a complex.

(Item 5) The pump unit according to any one of items 1 to 4, wherein the ion trap may further include a first housing that is provided in the flow path and has a first opening into which a mobile phase is introduceable, and a second housing that is provided in the flow path and has a second opening into which a mobile phase is able to be led out, the filter element may be attached between the first housing and the second housing such that a mobile phase introduced from the first opening passes through the filter element to be led out from the second opening, and a portion that comes into contact with a mobile phase in the second housing may be formed of a non-metallic material.

In this case, the filter element can be held in the flow path by the first and second housings. Further, because the portion of the second housing that comes into contact with a mobile phase is formed of a non-metallic material, metal ions are prevented from being eluted from the metal ion trap into the mobile phase at a position farther downstream than the filter element.

(Item 6) The pump unit according to item 5, wherein the metal ion trap may further include a seal member that surrounds the filter element and is arranged to seal between the first housing and the second housing.

In this case, a leak of a mobile phase between the first housing and the second housing is prevented.

(Item 7) The pump unit according to any one of items 1 to 6, wherein the pump may pump a mobile phase at a pressure equal to or larger than 40 MPa, and the metal ion trap may have resistance to a pressure equal to or larger than 40 MPa.

In this case, a mobile phase can be pumped at relatively high pressure.

(Item 8) A chromatograph according to another aspect may include the pump unit according to any one of items 1 to 7, a sample supplier that supplies a sample to a mobile phase pumped by the pump of the pump unit, a separation column through which a sample supplied by the sample supplier passes, and a detector that detects a sample that has passed through the separation column, wherein the metal ion trap of the pump unit may be provided between the pump and the sample supplier, and a portion that comes into contact with a mobile phase in each of the sample supplier, the separation column and the detector may be formed of a non-metallic material.

In this chromatograph, a sample is supplied by the sample supplier to a mobile phase pumped by the pump of the above-mentioned pump unit. Therefore, liquid can be sent at high pressure by the above-mentioned pump. The sample supplied by the sample supplier passes through the separation column. The sample that has passed through the separation column is detected by the detector. The metal ion trap of the pump unit is provided between the pump and the sample supplier.

With this configuration, even in a case in which metal ions are eluted from the metal member of the pump into a mobile phase, the metal ions are retained by the metal ion trap. Further, the portion that comes into contact with a mobile phase in each of the sample supplier, the separation column and the detector located at positions farther downstream than the metal ion trap are formed of a non-metallic material. Therefore, metal ions hardly interact with the material of the flow path at a position farther downstream than the metal ion trap. This suppresses an occurrence of a phenomenon that may degrade analysis accuracy such as adsorption of metal ions, peak tailing of a chromatogram, a change in retention characteristics of the separation column or a change in detection characteristics of the detector. As a result, it is possible to send liquid at high pressure while preventing degradation of analysis accuracy of a sample.

(Item 9) The chromatograph according to item 8, may further include a removal device that supplies an acid solvent to the metal ion trap to remove metal ions retained by the filter element.

In this case, metal ions retained in the filter element are removed. Thus, the chromatograph can be continuously used without replacement of the metal ion trap.

The invention claimed is:

1. A pump unit of a chromatograph including a separation column, the pump unit comprising:
   a pump that pumps a mobile phase through a flow path to the separation column; and
   a metal ion trap including a filter element provided at a position farther downstream than the pump in the flow path between pump and the separation column, wherein
   the pump includes a metal member that comes into contact with the mobile phase, and
   the filter element includes a metal ion retention structure for retaining metal ions by interacting with the metal ions eluted into the mobile phase due to contact between the metal member and the mobile phase.

2. The pump unit according to claim 1, wherein
the metal ion retention structure includes a functional group that forms a complex with metal ions.

3. The pump unit according to claim 1, wherein
the filter element includes a membrane in which an adsorptive resin carrier is bonded.

4. The pump unit according to claim 1, wherein
the filter element includes a column member filled with an adsorptive resin carrier.

5. The pump unit according to claim 1, wherein
the pump pumps the mobile phase at a pressure equal to or larger than 40 MPa, and
the metal ion trap has resistance to a pressure equal to or larger than 40 MPa.

6. A pump unit comprising;
a pump the pumps a mobile phase through a flow path; and
a metal ion trap including a filter element provided at a position farther downstream than the pump in the flow path, wherein
the pump includes a metal member that comes into contact with the mobile phase, and
the filter element includes metal ion retention structure for retaining metal ions by interacting with the metal ions eluted into the mobile phase to contact between the metal member and the mobile phase;
wherein the ion trap further includes:
   a first housing that is provided in the flow path and has a first opening into which the mobile phase is introduceable, and
   a second housing that is provided in the flow path and has a second opening into which the mobile phase is able to be led out, wherein the filter element is attached between the first housing and the second housing such that the mobile phase introduced from the first opening passes through the filter element to be led out from the second opening, and wherein a portion that comes into contact with the mobile phase in the second housing is formed of a non-metallic material.

7. The pump unit according to claim 6, wherein
the metal ion trap further includes a seal member that surrounds the filter element and is arranged to seal between the first housing and the second housing.

8. A chromatograph comprising:
a pump unit comprising:
  a pump that pumps a mobile phase through a flow path; and
  a metal ions trap including a filter element provided at a position farther downstream than the pump in the flow path, wherein
    the pump includes a metal member that comes into contact with the mobile phase, and
    the filter element includes a metal ion retention structure for retaining metal ions by interacting with the metal ions eluted into the mobile phase due to contact between the metal member and the mobile phase;
  a sample supplier that supplies a sample to the mobile phase pumped by the pump of the pump unit;
  a separation column through which a sample supplied by the sample supplier passes; and
  a detector that detects a sample that has passed through the separation column, wherein
    the metal ion trap of the pump unit is provided between the pump and the sample supplier, and
    a portion that comes into contact with the mobile phase in each of the sample supplier, the separation column and the detector is formed of a non-metallic material.

9. The chromatograph according to claim 8, further comprising a removal device that supplies an acid solvent to the metal ion trap to remove metal ions retained by the filter element.

* * * * *